(12) United States Patent
Hotta et al.

(10) Patent No.: US 10,291,644 B1
(45) Date of Patent: May 14, 2019

(54) SYSTEM AND METHOD FOR PRIORITIZING ENDPOINTS AND DETECTING POTENTIAL ROUTES TO HIGH VALUE ASSETS

(71) Applicant: SYMANTEC CORPORATION, Mountain View, CA (US)

(72) Inventors: Nobuto Hotta, Torrance, CA (US); Dinesh H. Bhirud, Long Beach, CA (US); Spencer D. Smith, El Segundo, CA (US); Adam Glick, Culver City, CA (US)

(73) Assignee: Symantec Corporation, Mountain View, CA (US)

( * ) Notice: Subject to any disclaimer, the term of this patent is extended or adjusted under 35 U.S.C. 154(b) by 198 days.

(21) Appl. No.: 15/387,458

(22) Filed: Dec. 21, 2016

(51) Int. Cl.
*H04L 29/06* (2006.01)
*H04L 12/721* (2013.01)

(52) U.S. Cl.
CPC ........ *H04L 63/1433* (2013.01); *H04L 45/123* (2013.01)

(58) Field of Classification Search
CPC . H04L 63/1433; H04L 63/1441; H04L 63/18; H04L 45/123; H04L 45/26; H04L 45/302; H04L 45/44; H04L 45/70; G06F 15/17312
USPC .......... 726/3, 14, 22, 25; 709/223, 224, 232, 709/239–242
See application file for complete search history.

(56) References Cited

U.S. PATENT DOCUMENTS

| | | | |
|---|---|---|---|
| 7,418,733 B2 * | 8/2008 | Connary | H04L 43/045 709/224 |
| 8,201,257 B1 * | 6/2012 | Andres | G06F 21/568 726/23 |
| 8,694,993 B1 * | 4/2014 | Dotan | H04L 67/42 709/203 |
| 9,143,435 B1 * | 9/2015 | Ramamoorthy | H04L 45/123 |
| 10,044,745 B1 * | 8/2018 | Jones | H04L 63/1433 |

(Continued)

FOREIGN PATENT DOCUMENTS

| | | | |
|---|---|---|---|
| CN | 101867933 B | * | 4/2013 |
| CN | 104104495 A | * | 10/2014 |

OTHER PUBLICATIONS

"Kordel, RDP vs. SSH/SSL/VPN for security, Dec. 24, 2009, Eberly Systems" (Year: 2009).*

(Continued)

*Primary Examiner* — Saleh Najjar
*Assistant Examiner* — Khalid M Almaghayreh
(74) *Attorney, Agent, or Firm* — Meyertons Hood Kivlin Kowert and Goetzel PC; Rory D. Rankin (57) ABSTRACT

A system and method for detecting potential system vulnerabilities to malicious attacks. A list of routes between computing devices and associated threat levels is maintained as network events occur between computing devices. The routes include bad hygiene endpoints, high value targets which are a variety of server types controlling access to sensitive data, and network connections. A list of routes connecting high value targets and bad hygiene endpoints are sorted by a priority level and used to identify potential routes. When a network event corresponding to a given route is detected, the list is searched to identify potential routes. Potential routes are monitored routes with no network events detected yet between the source and destination.

20 Claims, 4 Drawing Sheets

(56) References Cited

U.S. PATENT DOCUMENTS

| | | | | |
|---|---|---|---|---|
| 2004/0143753 | A1* | 7/2004 | Hernacki | H04L 63/14 |
| | | | | 726/25 |
| 2009/0006230 | A1* | 1/2009 | Lyda | G06Q 40/00 |
| | | | | 705/35 |
| 2010/0218236 | A1* | 8/2010 | Hardjono | H04L 63/0823 |
| | | | | 726/3 |
| 2012/0272331 | A1* | 10/2012 | Lemaster | H04L 63/0236 |
| | | | | 726/27 |
| 2012/0290716 | A1* | 11/2012 | Ogielski | H04L 41/00 |
| | | | | 709/224 |
| 2013/0308468 | A1* | 11/2013 | Cowie | H04L 43/04 |
| | | | | 370/248 |
| 2016/0330236 | A1* | 11/2016 | Reddy | H04L 63/1466 |

OTHER PUBLICATIONS

Bhirud, et al., U.S. Appl. No. 15/198,778, entitled "Dynamically Ranking and Presentation of Endpoints Based on Age of Symptoms and Importance of the Endpoint in the Environment", filed Jun. 30, 2016, 37 pages.

* cited by examiner

SYSTEM AND METHOD FOR PRIORITIZING ENDPOINTS AND DETECTING POTENTIAL ROUTES TO HIGH VALUE ASSETS

BACKGROUND OF THE INVENTION

Field of the Invention

This invention relates to the field of computer security and, more particularly, to detecting potential system vulnerabilities for malicious attacks.

Description of the Related Art

In various embodiments, a relatively large organization provides a network accessible only to members of the organization. An intranet portal may be used to provide access to resources stored on a variety of remote servers. Members of the organization access information from multiple sources for a variety of reasons, such as performing business transactions, updating work flows and presentations, file sharing, communicating through one or more of email and intranet sites and so forth. The members access the remote servers through computing devices such as a desktop computer, a laptop, a smartphone and so on. Software applications and data are located on the remote servers, which communicate with the user's computing device.

Among the data stored on the remote servers within the organization is sensitive information associated with members of the organization and external customers and vendors. Examples of the sensitive information are login user identification and passwords, account numbers, credit card numbers, residential and employment contact information and so on. Malicious attackers use a variety of methods and schemes to obtain this sensitive information which become more complex and adaptive over time. No one single solution can be used to protect against the numerous and sophisticated attacks.

The organization utilizes an integrated security strategy which includes multiple methods, software and services with some services even from third parties to track and investigate suspicious events and mitigate any detected attacks. However, as both the number of hardware components and amount of sensitive data increases, so does the amount of reporting of suspicious events and known attacks within the organization. Administrators and incident responders gain access to a relatively large amount of security information, but also they are pressured for time to identify and neutralize, or remove, the most dangerous threats first.

In view of the above, improved systems and methods for detecting potential system vulnerabilities for malicious attacks are desired.

SUMMARY OF THE INVENTION

Systems and methods for detecting potential system vulnerabilities for malicious attacks are contemplated. In various embodiments, many computing devices generate data access requests to be serviced by other computing devices. Examples of the computing devices are desktop computers, a variety of servers, and a variety of mobile computing devices. The access requests are transferred over one or more network connections. In various embodiments, the computing devices are used within an organizational center. An integrated security strategy monitors threat levels within the organizational center. For example, a security service monitors a number and type of malicious attacks on computing devices. In some embodiments, a bad hygiene endpoint (BHE) is a user computing device with a level vulnerability to malicious attacks above a threshold. The endpoint may have already experienced a number of attacks of a particular type or a frequency of attacks above a threshold. In various embodiments, the security service assigns weights to the bad hygiene endpoints based on the severity of the attacks on the endpoints.

The security service also monitors the sensitivity levels of data storage and assigns weights to high value targets controlling access to the data storage. In various embodiments, the high value targets (HVTs) are a variety of server types within the organizational center. Further, the security service also monitors the level of invasiveness of network connections used for transferring the access requests. Many routes (or "paths") across the organizational center used for communicating access requests and responses include at least the bad hygiene endpoints, the high value targets and the network connections between them. The security service uses the weights for these components to generate threat levels for the routes and sorts a list of routes based on the generated threat levels.

When the security service detects a network event which communicates an access request between two computing devices, such as devices "A" and "B", the security service determines another route with a corresponding entry in the list includes one of the two computing devices used in the new route. In other words, a path exists between an entry in the list and one or both of devices A and B. For example, the identified other route includes computing devices "B" and "C" as endpoints. Similar to the computing devices "A" and "B," the computing device "C" is an endpoint such as a bad hygiene endpoint or a high value target.

The list is traversed beginning with the identified other route until a finishing point is reached. In various embodiments, the finishing point is a bad hygiene endpoint or a high value target. In this example, traversing begins and ends with the identified other route, which includes computing devices "B" and "C." A new route is inserted in the list and the new route is between the computing devices "A" and "C." The new route is inserted in the list although no network events have been detected between the computing devices "A" and "C." Monitored routes with no detected network events between the source and destination are potential routes. The potential routes may be used by incident responders to be proactive before a malicious attack occurs, rather than reactive after a malicious attack occurred.

These and other embodiments will be appreciated upon reference to the following description and accompanying drawings.

DETAILED DESCRIPTION

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

In the following description, numerous specific details are set forth to provide a thorough understanding of the present invention. However, one having ordinary skill in the art should recognize that the invention might be practiced without these specific details. In some instances, well-known circuits, structures, signals, computer program instruction, and techniques have not been shown in detail to avoid obscuring the present invention.

Figure 1:
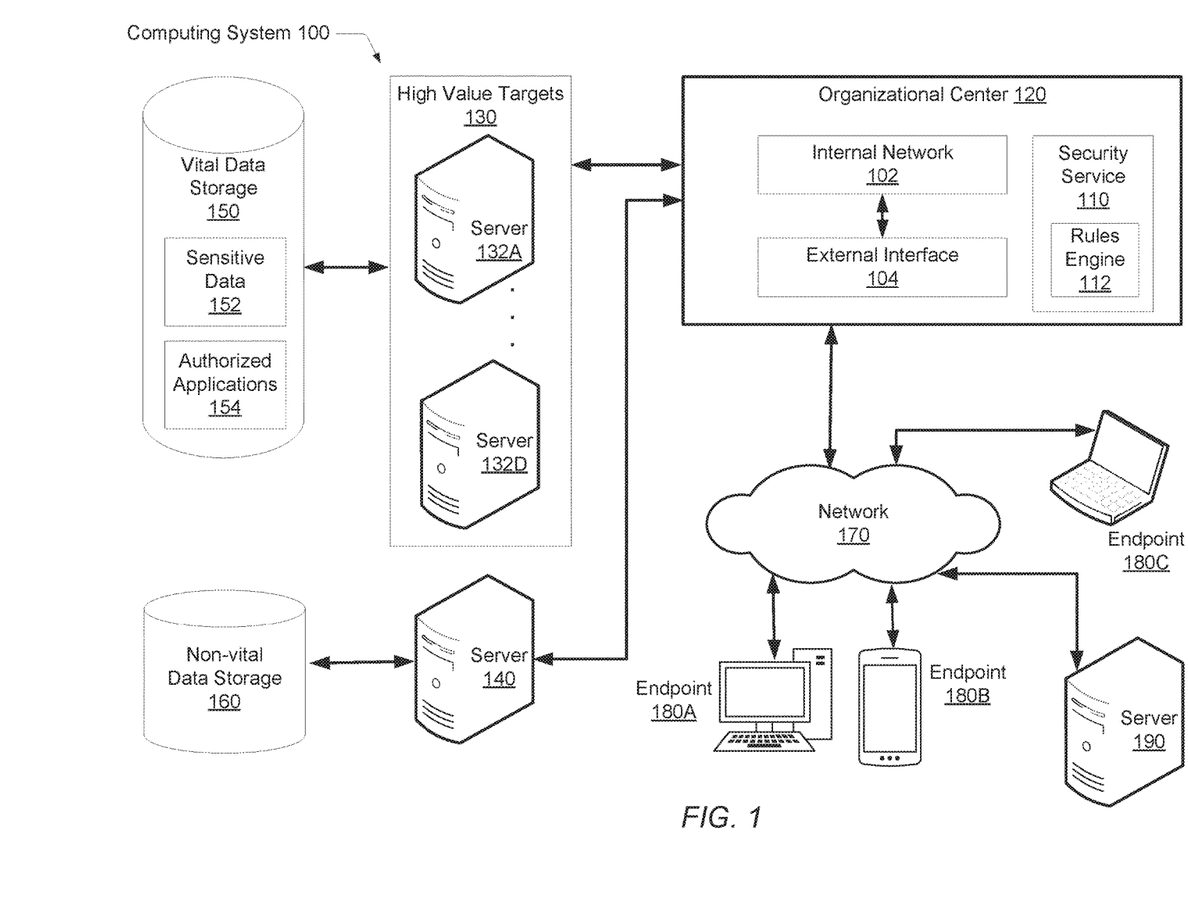
FIG. 1 is a generalized block diagram illustrating one embodiment of a computing system.

Referring to FIG. 1, a generalized block diagram of one embodiment of a computing system 100 is shown. In the illustrated embodiment, the organizational center 120 includes an internal network 102 which communicates with external entities through an external interface 104. For example, the organizational center 120 communicates with endpoints 180A-180C through the network 170. Each of the endpoints 180A-180C may include a network interface supporting one or more communication protocols for data and message transfers through the network 170. Although a single interface is shown, the external interface 104 may include multiple interfaces supporting a variety of communication protocols. The servers 132A-132D and 140 process software and include hardware for supporting the organizational center 120. The organizational center 120 also communicates with the vital data storage 150 via one or more of the servers 132A-132D and non-vital data storage 160 via the server 140.

In various embodiments, the organizational center 120 utilizes an intranet network for providing data and services accessible only to members of a particular organization. An intranet portal may be used to provide access to resources with a user-friendly interface such as graphical user interfaces (GUIs) and dashboards. In some embodiments, the organizational center is supported by software such as the MICROSOFT SHAREPOINT collaborative platform (MICROSOFT and SHAREPOINT are registered trademarks of Microsoft Corporation), HUDDLE collaborative platform, GOOGLE FOR WORK applications (GOOGLE is a registered trademark of Google LLC), and so forth.

The information and services made available by the internal network 102 is unavailable to the general public through direct access. For example, persons could not use the Internet to directly access the information and services provided by the internal network 102. Through user authentication, the staff members are able to access resources through the internal network 102 to communicate with other staff members, collaborate on projects and monitor product development, update products, documents and tools stored in a centralized repository and so forth. The internal network 102 may also include one or more web portals, search engines, tools for data visualization and so forth.

The external interface 104 may include one or more push notification services for coordinating notifications and data retrieval for the endpoints 180A-180C. In addition, the external interface 104 may include application programming interfaces (APIs) supporting the representational state transfer (REST) architectural style used for Web development. The APIs may also be used for notifications, handling a communication protocol for processing requests and data collection or retrieval.

The external interface 104 may support an extranet network which allows customers, partners, and suppliers to securely access a selected portion of the resources available within the internal network 102. The external interface 104 may use one or more communication protocols to allow access through the network 170. The network 170 may include multiple switches, routers, cables, wireless transmitters and the Internet for transferring messages and data. Accordingly, the external interface 104 may support at least the Hypertext Transfer Protocol (HTTP) for communication across the World Wide Web.

The servers 132A-132D and 140 are used for supporting the organizational center 120. The servers 132A-132D and 140 may include a variety of server types such as database servers, computing servers, application servers, file servers, domain name system (DNS) servers, mail servers and so on. In various embodiments, the content stored on servers 132A-132D and 140 is considered secure as verification is done by one or more security applications and/or by a system administrator installing content prior to the content is made available through the internal network 102 and the external interface 104. Other components of the organizational center 120 such as gateways, routers, switches, firewalls, other networks and so on, are not shown for ease of illustration.

One or more of the servers 132A-132D control access to the vital data storage 150 while at least the server 140 controls access to the non-vital data storage 160. In some embodiments, the data and associated metadata of data storage 150 and 160 are stored on individual remote storage devices such as hard disk drives, solid state drives, server blades, or specialized devices, and may include a variety of memory devices such as RAM, Flash RAM, MEMS (Micro-ElectroMechanical Systems) storage, battery-backed RAM, and/or non-volatile RAM (NVRAM), etc.

The data and associated metadata of data storage 150 and 160 may be stored in one of a variety of well-known layouts, such as RAID-1, RAID-DP, RAID-5, RAID-6, an erasure-coded data representation scheme, etc., in which the reliability of storage may be enhanced by redundancy and/or error correction capabilities. In various embodiments, one of a variety encryption techniques is used to protect the data and associated metadata of data storage 150 and 160. In some embodiments, the metadata may be stored in a separate location from the associated data. An authorized endpoint may retrieve metadata from a first server in order to identify a desired data storage location within a storage subsystem.

In various embodiments, the vital data storage 150 stores information considered to be sensitive data. Examples of the sensitive data 152 are user credential information such as user authentication identifiers (IDs) and passwords, account numbers, credit card numbers, residential and employment contact information, confidential communication such as work emails and social network correspondence, and so on. Additionally, the vital data storage 150 stores authorized applications 154 which are particular applications and scripts. These applications and scripts may be guarded and only authorized users are permitted to run them. For example, the human relations department runs particular applications for accounting and personnel matters which are not accessible to the marketing or design teams. Other examples of the authorized applications 154 are software applications used for numerical analysis, ecommerce, scheduling, database management, security and so forth.

In some embodiments, the non-vital data storage 160 stores information which is not considered to be sensitive data. Examples of the data and associated metadata in the data storage 160 are documents listing holidays for the organization, contact and site location information already provided to the general public, relatively old organization charts, and other relatively old information considered to be out-of-date. This type of data may be stored in separate storage locations than locations used for the sensitive data 152 and the authorized applications 154.

In various embodiments, the levels of sensitivity for the sensitive data 152 and the authorized applications 154 are measured by multiple grades or levels such as high, medium and low. Weights with a wide range and/or a relatively fine granularity may also be used. Other types of levels for measuring the level of sensitivity of the stored data are possible and contemplated. In various embodiments, the selected level of sensitivity, or the weights, of sensitive data is associated with the server controlling access to the sensitive data, which is one or more of the servers 132A-132D in the illustrated embodiment. As they control access to the sensitive data 152 and the authorized applications 154, the servers 132A-132D are referred to as high value targets (HVTs). The high value targets 130 control access to the sensitive data 152 and the authorized applications 154 whether the content is stored locally or stored in a variety of remote storage devices as in the vital data storage 150 using a variety of storage configurations.

In some embodiments, no weights are used for the server 140 controlling access to the non-vital data storage 160. However, no weight may be interpreted as a zero value weight. In other embodiments, a relatively low value is used for the weight of the server 140, which may be a significantly lower value compared to the weights used for the servers 132A-132D of the high value targets 130.

The weights of the servers 132A-132D of the HVTs 130 and possibly the server 140 are used by the security service 110. The security service 110 may also use weights of other components such as at least one or more of the endpoints 180A-180C, which have been found to be bad hygiene endpoints (BHEs), and the network connections between the servers 132A-132D and the one or more bad hygiene endpoints of the endpoints 180A-180C. In various embodiments, the security service 110 is used as a larger threat management solution, such as an integrated security strategy, for the computing system 100. In various embodiments, the integrated security strategy utilizes a combination of methods and mechanisms to detect, report and potentially stop sophisticated malware, intrusions, botnets and other types of hacking-based attacks. Examples of the methods and mechanisms are web application firewalls, secure email gateways, user identity authentication, patch management, virtual private network (VPN) for providing an encrypted connection over less secure networks, and endpoint security clients (also referred to as agents or sensors).

Multiple policies are defined and modified by system administrators, security personnel and third-party contractors to protect the sensitive data stored within the computing system 100. The security service 110 for the computing system 100 may be provided as hardware, a virtual appliance, a cloud-based service, or a combination thereof. Examples of the security service are Symantec Advanced Threat Protection, Microsoft Advanced Threat Analytics, and Fortinet Sandbox.

The rules engine 112 provides rules and/or algorithms for updating the weights of the HVTs 130 and other selected components, combining the weights and presenting output corresponding to the combination of the weights. The rules and/or algorithms used for updating and combining the weights are determined and modified by system administrators, security personnel and third-party contractors. The rules engine 112 may use one or more control units and control and status registers for updating programmable weights and updating the steps used in rules and/or algorithms.

In various embodiments, the rules engine 112 detects network activity such as access requests for the sensitive data 152 and the authorized applications 154, and records the route of the access request from the source of the access request, such as one of the endpoints 180A-180C, along with the network connections between the source and the targeted server of the servers 132A-132D controlling access to the targeted data. The rules engine 112 accesses weights for the source (e.g., one of the endpoints 180A-180C), weights for the network connectivity traversed by the access request, and weights for one of the servers 132A-132D controlling access to the targeted data. The rules engine 112 assigns a risk value to the route and prioritizes the route with other routes.

In addition to the above steps, the rules engine 112 also determines other potential routes which may have not yet been traversed. These other routes are found based on the detected network activity and past detected network events which are stored in a local or remote database. For example, the rules engine 112 may search for ports on the source and destination of the detected access request, which is also the network event, as well as search for ports on intermediate nodes used to traverse the access request. The rules engine 112 uses this information to identify potential routes, assign risk values to these potential routes, and prioritize the potential routes with other routes. In various embodiments, the higher risk routes are routes with a combination of an endpoint of the endpoints 180A-180C with a high level of compromise, network connections with capability of providing a malicious attacker with invasive control of computers, and one of the servers 132A-132D of the high value targets 130 controlling access for relatively high sensitivity data. Before providing further details, the remaining components of the computing system 100 are described.

In various embodiments, the servers 132A-132D and 140 operate with a client-server architectural model with the endpoints 180A-180C. Examples of the endpoints 180A-180C are desktop computers and mobile computing devices such as laptops, tablet computers, smartphones, smartwatches, netbook computers and so forth. At least the operating system and the processor(s) used by at least one of the endpoints 180A-180C may differ from the operating system and the processor(s) used by others of the endpoints 180A-180C. Each of the endpoints 180A-180C may use a MAC OS X operating system, a MICROSOFT Windows operating system, a UNIX-like operating system, a mobile device operating system, or a combination wherein a hard disk is partitioned to host multiple operating systems.

In various embodiments, the endpoints 180A-180C use a processing unit for processing instructions of computer programs. In some embodiments, the processing unit uses one or more homogeneous cores. In other embodiments, the processing unit uses heterogeneous cores, such as a general-purpose core as used in central processing units (CPUs) and a parallel processing architected core. The parallel architected core may be a graphics processing unit (GPU), a digital signal processing unit (DSP) or other.

In various embodiments, the endpoints 180A-180C additionally communicate and transfer information with the server 190 via the network 170. The connections between the endpoints 180A-180C and the remote server 190 include at least the Internet, wherein each of the endpoints 180A-180C and the remote server 190 use the Hypertext Transfer Protocol (HTTP) to transfer messages. Accordingly, in various embodiments, the network 170 is the Internet. Multiple routers, switches, network cables, wireless technologies and so forth may be used in the network 170 to transfer messages and content between the endpoints 180A-180C and the server 170. In various embodiments, the content stored on server 190 is not considered secure as content stored on the servers 132A-132D and 140 as it is unknown whether verification has been performed at all let alone by a system administrator for the organizational center 120. A further description of the rules and algorithms used by at least the rules engine 112 follows.

Figure 2:
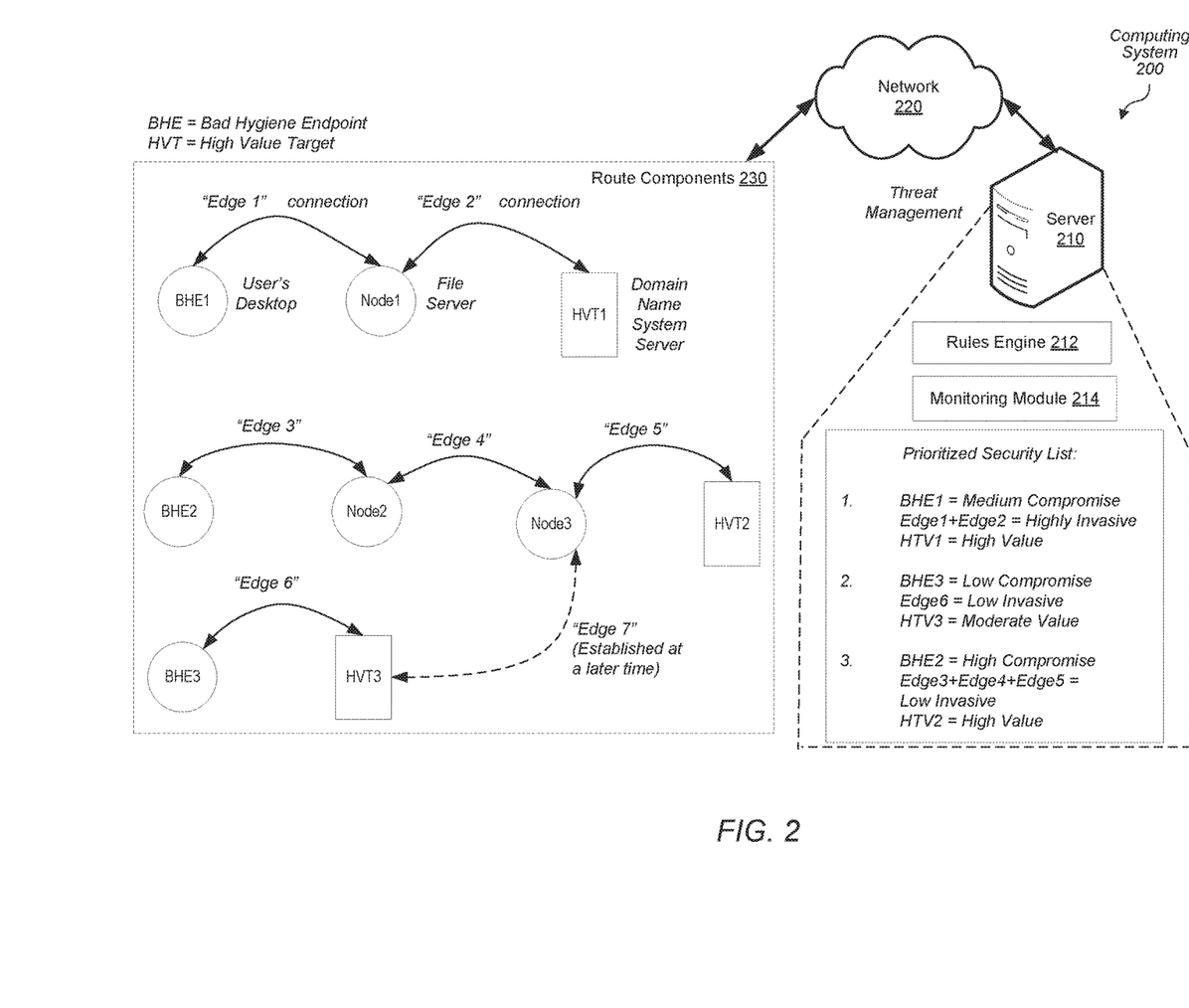
FIG. 2 is a generalized block diagram illustrating one embodiment of a method for detecting potential system vulnerabilities for malicious attacks.

Referring to FIG. 2, a generalized block diagram of another embodiment of a computing system 200 is shown. In the illustrated embodiment, the route components 230 communicate with the server 210 via the network 220. The route components 230 include multiple bad hygiene endpoints (BHEs), high value targets (HVTs) having access to sensitive data, and nodes. Other components such as gateways, routers, switches, firewalls, other networks and so on, are not shown for ease of illustration. Each of the nodes in the route components 230 is representative of another remote server or one of the examples of other hardware components. In various embodiments, one or more of the components within the route components are used within an organizational center as described earlier.

In various embodiments, endpoints are monitored by software such as an agent or sensor. The monitoring detects and reports a variety of indicators of compromise (IOCs), which are artifacts detected such as in the operating system or network port or controller of an endpoint. The indicators of compromise indicate with a relatively high confidence an intrusion with malicious intent occurred on the endpoint. Examples of indicators of compromise are hash outputs of malware files or URLs, virus signatures and virus IP addresses, domain names of botnet command and control servers, and so on.

In some embodiments, a bad hygiene endpoint (BHE) is an endpoint with a level of compromise, or vulnerability to malicious attacks, above a given threshold. The endpoint may have already experienced a number of attacks of a particular type. In other embodiments, the bad hygiene endpoint is an endpoint with no attacks or a small number of attacks, but the endpoint has a predicted level of compromise above a threshold as the endpoint is believed to be prone to compromise based on a limited number or limited quality of installed security applications and externally provided security.

In one example, a user's desktop computer may have been targeted by malware twice in the past three days. Accordingly, the user's desktop computer may not qualify to be a bad hygiene endpoint. However, if the user's desktop has been targeted by malware or other malicious attacks five times in the past hour, then the user's desktop computer may qualify to be a bad hygiene endpoint. In another example, the user's desktop computer has not yet received malicious attacks, but the amount of security provided by installed applications and provided from firewalls does not exceed a threshold. Therefore, the endpoint may be labeled as a bad hygiene endpoint despite no occurrence yet of malicious attacks. The amount of bad hygiene for the endpoint may be measured by multiple grades or levels such as high, medium and low. Weights with a wide range and/or a relatively fine granularity may also be used. Other types of levels for measuring the amount of bad hygiene for the endpoints are possible and contemplated.

Weights (e.g., levels of security compromise) of the bad hygiene endpoint and weights (e.g., levels of sensitivity) for high value targets controlling access to stored sensitive data are defined and used by the rules engine 212 on the server 210. Additionally, weights (e.g., levels of invasiveness) of the network connectivity between the bad hygiene endpoints and the high value targets are defined and used. Examples of the network protocols used to connect two computing devices are a remote desktop protocol (RDP), a secure shell (SSH) network protocol, a user datagram protocol (UDP), a file transfer protocol (FTP), a server message block (SMB) protocol, and so on. In one example, system administrators assign higher weights to RDP and SSH network connections than weights of other network connections as these protocols provide malicious attackers more control within a computing device once the computing device is accessed.

Many routes are created as applications are executed and network actions are taken. For example, applications running on endpoints generate access requests for data and services on other endpoints and high value targets. The weights for the bad hygiene endpoints, the high value targets and the network connectivity between are used by the rules engine 212 to assign a risk values to the routes and prioritize the route with one another.

In various embodiments, an integrated security strategy uses risk event values as a metric for presenting a state of security for the computing system 200. Risk event values are also referred to as threat levels as both provide a measurement for potential security threats to the computing system 200. In various embodiments, the risk event values are used to prioritize, or rank, a list of routes where each route includes a path from a bad hygiene endpoint (BHE) to a high value target (HVT) controlling access to sensitive data. The bad hygiene endpoint may be a user's desktop computer which has been compromised by malicious attacks, and the high value target is a server storing sensitive data such as employee or customer passwords, credit card numbers and so on. The associated route includes at least the bad hygiene endpoint, the high value target and the network connectivity between them.

The risk event value is used as the priority level of a corresponding route indicating whether incident responders should investigate the route ahead of other routes. In various embodiments, the risk event value is represented as a numeric value determined from a weighted sum or other combination of one or more inputs based on rules and/or algorithms. The rules and/or algorithms are determined and modified by system administrators, security personnel and third-party contractors.

In various embodiments, the rules engine 212 stores weights and uses control logic to implement the rules and/or algorithms. The rules engine 212 may use one or more control units and control and status registers for updating programmable weights and updating the steps used in algorithms to determine the risk event values. The monitoring module 214 may be used to detect network activity and receive indications of network events such as access requests traversing components of the network components 230. Agents may be installed on one or more of the route components 230 and used to report the network events. The monitoring module 214 may notify the rules engine 212 of new network events.

In the illustrated embodiment, one route is shown starting from a user's desktop (BHE1), which has already been compromised or has a level of security below a threshold. Therefore, the user's desktop computer qualifies as a bad hygiene endpoint. The route continues via a remote desktop protocol (RDP) (or other communication protocol) connection (Edge1) to a file server (Node1). This route is identified by the monitoring module 112 detecting network activity such as the bad hygiene endpoint (BHE1) sends a write request to the relatively good (uncompromised) file server (Node1). The risk event value for this route may be an output of an algorithm within the rules engine 212 using weights associated with each of BHE1, Edge1 and Node1. The risk event value is used to prioritize this route with other routes.

The monitoring module 214 may also detect a user logs into the relatively good (uncompromised) domain name system (DNS) server, which is a high value target (HVT1), and copies files from the relatively good file server (Node1). The route uses a remote desktop protocol (RDP) connection (Edge2) between HVT1 and Node1. The risk event value for this route may be an output of an algorithm within the rules engine 212 using weights associated with each of HVT1, Edge2 and Node1. The risk event value is used to prioritize this route with other routes.

Although there has been no access requests (network traffic) between the bad hygiene endpoint (BHE1) and the domain name system (DNS) server, which is the high value target (HVT1), the rules engine 212 uses the data from the above two routes and identifies a potential route from BHE1 to HVT1. This potential route uses BHE1, Edge1, Node1, Edge2 and HVT1. From the apparently benign network activity of the second route between HVT1 and Node1, the rules engine 212 generates this potential route. Potential routes are also referred to as potential pivoting routes.

In various embodiments, the risk event value for this potential route is an output of an algorithm within the rules engine 212 using weights associated with one or more of BHE1, Edge1, Node1, Edge2 and HVT1. The risk event value is used to prioritize this potential route with other routes. In some embodiments, one or more weights are updated based on whether BHE1 and HVT1 have ever accessed the same data with access controlled by Node1 representing the file server.

The risk event values for the above two routes and the corresponding generated potential route are compared to the risk event values of other routes allowing the rules engine 212 to generate a prioritized list. The prioritized list is presented using a variety of methods such as a textual list or a graphic pie chart or other graphic representation. The prioritized list may be presented in a dashboard, a GUI, within email or text messages and so on.

Depending on the network activity, the number of potential routes generated by the rules engine 212 varies. For example, if an access request is transferred between BHE2 and Node2 as well an access request is transferred between HVT2 and Node2, then the rules engine 212 may generate the potential route between BHE2 and HVT2. This generated potential route includes BHE2, Edge3, Node2, Edge4, Node3, Edge5 and HVT2. Weights for one or more of these components are used by an algorithm within the rules engine 212 to generate a corresponding risk event value. This risk event value is sorted with the risk event values of other routes.

However, if an access request is transferred between BHE2 and Node2 as well an access request is transferred between HVT2 and Node3, then in some embodiments, the rules engine 212 may not generate any potential routes as no network activity occurred between Node2 and Node3. In other embodiments, the rules engine 212 may generate the above potential route between BHE2 and HVT2 based on known ports and connections. Additionally, the rules engine 212 may adjust one or more weights used to generate the corresponding risk event value since no actual network activity has yet occurred on Edge4 between Node2 and Node3. The algorithms within the rules engine 212 determine any adjustments.

In a similar manner, when network activity corresponding to Edge7 is detected at a later time between HVT3 and Node3 by the monitoring module 214, the algorithms within the rules engine 212 may generate one or more potential routes based on the available network connections and the previous detected routes. For example, if an access request currently occurs between HVT3 and Node3, the rules engine 212 may generate at least two new potential routes. The first potential route is between BHE2 and HVT3 using Edge3, Node2, Edge4, Node3 and the current Edge7. The second potential route is between BHE3 and HVT2 using Edge6, HVT3, the current Edge7 and Edge5. Weights for one or more of these components are used by the rules engine 212 to generate corresponding risk event values for the two potential routes. These risk event values are sorted with the risk event values of other routes.

A short priority list is presented as a small example within the server 210. In the example shown, the route beginning with BHE1 is the highest security risk followed by the route beginning with BHE3 which is followed by the route beginning with BHE2. However, numerous other routes may generated and the list may be updated and resorted frequently based on network activity. As described earlier, system administrators, security personnel and third-party contractors may update the algorithms within the rules engine 212 used for identifying potential routes, selecting which components within both detected routes and identified potential routes to use for generating risk event values, recording routes, analyzing the recorded routes, determining how to present the risk events, determining the frequency for reporting the prioritized list and determining who to notify of the list.

Figure 3:
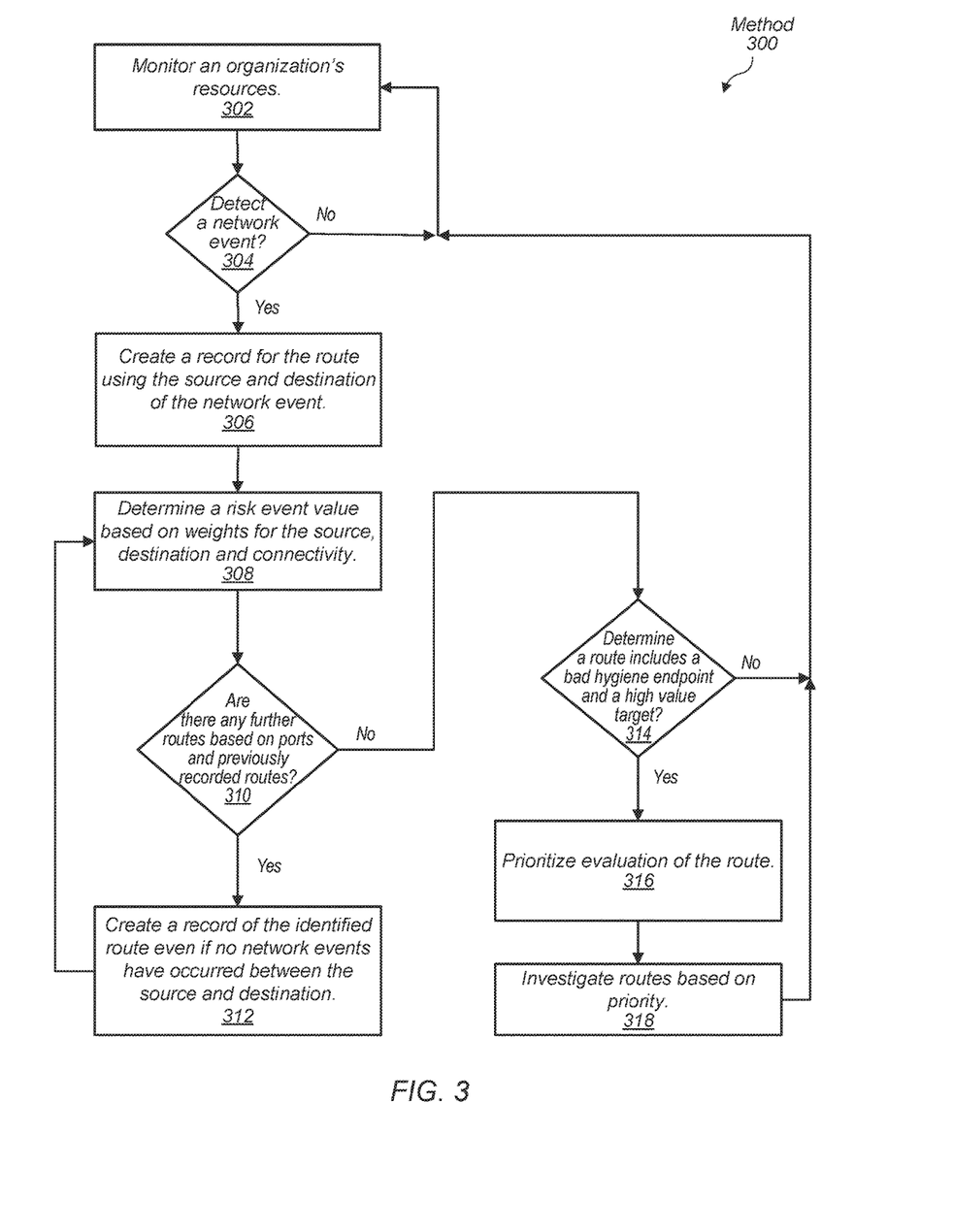
FIG. 3 is a generalized block diagram illustrating one embodiment of a method for recording vulnerability characteristics of a route.

Turning now to FIG. 3, one embodiment of a method 300 for detecting potential system vulnerabilities for malicious attacks is shown. For purposes of discussion, the steps in this embodiment (as well as method 400 in FIG. 4) are shown in sequential order. However, some steps may occur in a different order than shown, some steps may be performed concurrently, some steps may be combined with other steps, and some steps may be absent in another embodiment.

An organization's resources are monitored (block 302). In various embodiments, network activity is reported by agents, sensors or other. In other embodiments, one or more stored logs of network activity are accessed to identify new network events. Network events include access requests between a source and a destination via a network. In various embodiments, the source and the destination are computing devices within the organization such as desktop computers, servers and a variety of mobile computing devices. If a network event is detected ("yes" branch of the conditional block 304), then a record or entry is created for the route using the source and destination (block 306).

In various embodiments, the record identifies the source, the destination, the type of network connection(s) used for traversing the access request, and any intermediate nodes. In some embodiments, an address range for the access request is also recorded. Other aspects of the access request such as a priority level, the sensitivity level of the data to access, a number of hops and so forth may also be recorded. In addition, one or more lookup operations may occur to determine weights for the source, destination and network connectivity. In some embodiments, weights are also searched for one or more intermediate nodes. As described earlier, weights (e.g., levels of security compromise) of the bad hygiene endpoint, weights (e.g., levels of sensitivity) for high value targets controlling access to stored sensitive data, and weights (e.g., levels of invasiveness) of the network connectivity between the bad hygiene endpoints and the high value targets are retrieved for the route. In various embodiments, the higher the level of security concern, the higher the weight value. In other embodiments, low weight values may be used to indicate high levels of security concern.

A risk event value is determined based on weights for at least the source, destination and network connectivity (block 308). In some embodiments, the weights of one or more intermediate nodes are also used. In various embodiments, the weights are programmable values. Additionally, the algorithm used to receive the weights and generate the risk event value is adjustable. The algorithm may be implemented in hardware, software or a combination. Further, in various embodiments, one or more of the weights for the source, destination, network connectivity and intermediate nodes are increased. In some embodiments, the weight increase occurs prior to using the algorithm to combine the weights. In other embodiments, the weight increase occurs within the algorithm. As the algorithm may select and increase weights, the risk event value may be made to emphasize the priority on the endpoint, the detected network event, the high value target, or other. Therefore, the resorting of the list of routes is programmable.

In other embodiments, an indication of the detected network event is also stored to be used in a later investigation. The indication may include details of the network event such as a transaction type, source and destination addresses, an amount of data being accessed and/or transferred, and so on. In some embodiments, a weight value is assigned to the network event and used in the above algorithm. In various embodiments, one or more of the network event, the bad hygiene endpoint, and the high value target are used later in an investigation while utilizing the security service. As described earlier, Examples of the security service are Symantec Advanced Threat Protection, Microsoft Advanced Threat Analytics, and Fortinet Sandbox. In some embodiments, based on the selected security service, the network event is also referred to as an incident or campaign.

If any further routes are identified based on ports and previously recorded routes ("yes" branch of the conditional block 310), then a record of the identified route is created even if no network events have yet occurred between the source and destination (block 312). Identified routes with no detected network events between the source and destination are potential routes. The potential routes may be used by incident responders to be proactive before a malicious attack occurs, rather than reactive after a malicious attack occurred.

When there are no further identified routes based on ports and previously recorded routes ("no" branch of the conditional block 310), and no routes include a bad hygiene endpoint and a high value target as a source and destination ("no" branch of the conditional block 314), then control flow of method 300 returns to block 302 and the organization's resources are monitored. However, when there are no further identified routes based on ports and previously recorded routes ("no" branch of the conditional block 310), and routes do exist which include a bad hygiene endpoint and a high value target as a source and destination ("yes" branch of the conditional block 314), then the route is prioritized among other routes based on established rules for the weights of the components used in the routes (block 316).

Afterward, the routes are investigated based on the priorities which are the risk event values determined for the routes (block 318). As the prioritized list includes potential routes, incident responders are able to investigate high priority routes even if no network activity has yet occurred between the source and destination. In various embodiments, when risk event values exceed a threshold, or a number of routes with risk event values above a certain value exceed threshold, alerts are sent to system administrators, security personnel and so forth. The alerts can be sent to one or more devices accessible by the administrator. For example, text messages may be sent to a smartphone or a smartwatch, an email may be sent, and a push notification may be sent.

Figure 4:
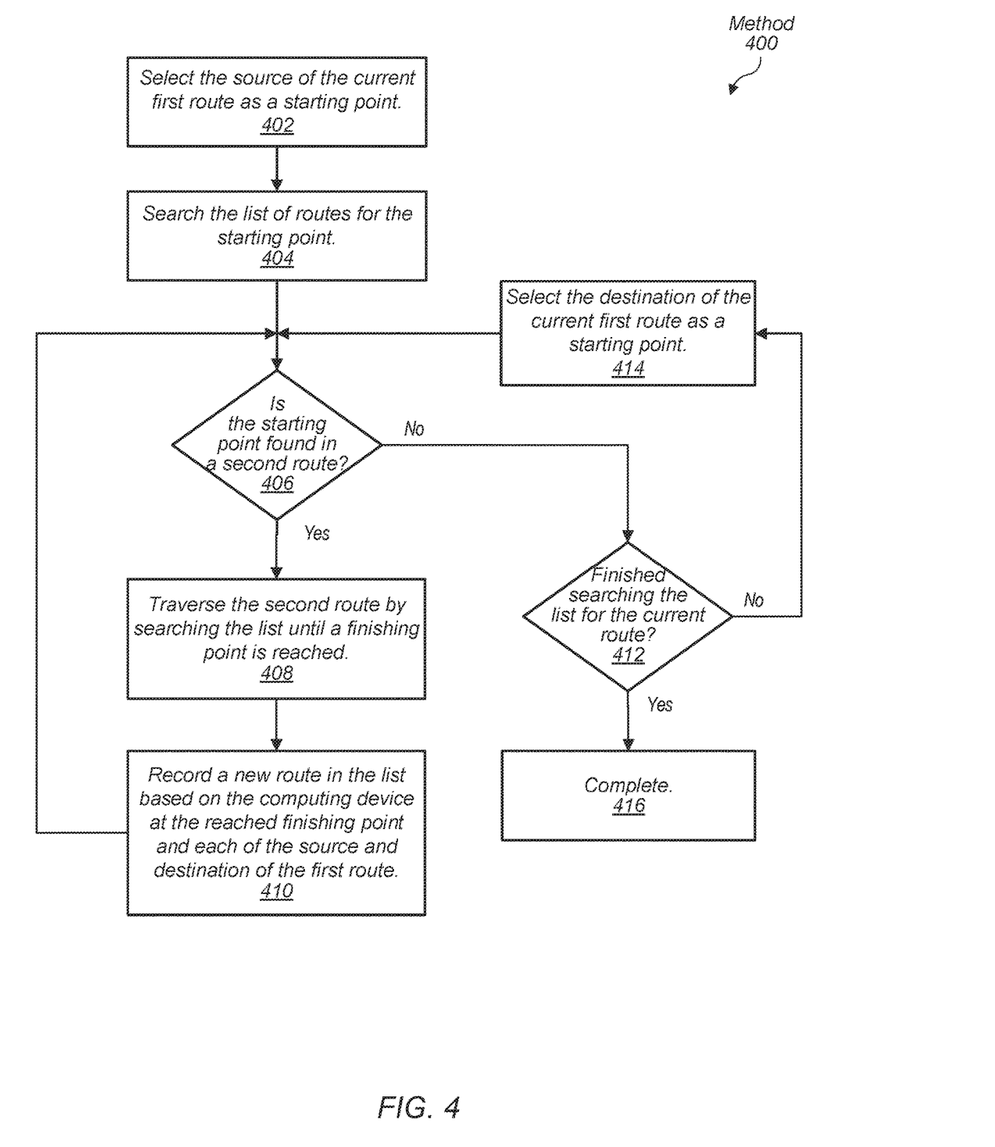
FIG. 4 is a generalized block diagram illustrating one embodiment of a method for recording potential routes in a prioritized list of risk events.

Turning now to FIG. 4, one embodiment of a method 400 for recording potential routes in a prioritized list of risk events is shown. In various embodiments, a route is identified based on a detected network event. For example, a source generated an access request which is sent to a destination across a network. Each of the source and the destination is a good endpoint, a bad hygiene endpoint, a good high value target, a compromised high value target, a good node (e.g., one of a variety of server types, a router, a gateway) and a compromised node. The source of the current first route is selected as a starting point for a search of a list of prioritized routes (block 402) in order to find other potential routes.

The list of prioritized routes is searched for the starting point (block 404). The list of prioritized routes may be stored in a variety of data structures and the corresponding search technique is also one of a variety of search methods. The starting point may be a source or a destination in other routes within the list of prioritized routes. As the routes are prioritized based on the risk event value, and not prioritized based on the source or destination, the prioritization may not aid the selected search technique. However, one or more prioritized lists may be used, such as a list corresponding to a particular region, so the selected search technique is aided.

If the starting point is found in a second route within the prioritized list ("yes" branch of the conditional block 406), then the second route is traversed by searching the list until a finishing point is reached (block 408). In various embodiments, the finishing point is a bad hygiene endpoint or a high value target. A new route is recorded in the list based on the computing device at the reached end and each of the source and destination of the first route (block 410). Control flow of method 400 returns to the conditional block 406 to determine whether yet other routes include the starting point.

If the starting point is not found in a second route within the prioritized list ("no" branch of the conditional block 406), but searching the prioritized list for the current route is not finished ("no" block of the conditional block 412), then the destination of the current first route is selected as a starting point for a search of a list of prioritized routes (block 414) in order to find other potential routes. In other embodiments, the searching of the prioritized list begin with the destination and follows with the source. In yet other embodiments, the searching of the prioritized list is done simultaneously for the source and the destination of the current first route.

Afterward, control flow of method 400 returns to the conditional block 406 to determine whether yet other routes include the starting point. However, if the starting point is not found in a second route within the prioritized list ("no" branch of the conditional block 406), and searching the prioritized list for the current route is finished ("yes" block of the conditional block 412) as both the source and the destination have been searched, then the process completes (block 416).

Referring briefly back to the example in FIG. 2, when the user logs into HVT1 and copies files from Node1, a route is created for the prioritized list with HVT1 as the source and Node1 as the destination. A later search of the prioritized list for the source (HVT1) provides no results. However, a later search of the prioritized list for the destination (Node1) provides the route between BHE1 and Node1. Therefore, as described above for block 410, a new route is recorded in the prioritized list based on the found endpoint (BHE1) and each of the source (HVT1) and destination (Node1) of the first route. This new route is a potential route and this new route is inserted in the prioritized list despite there has not yet been any network events between BHE1 and HVT1. Incident responders may be proactive in mitigating any attacks before a malicious attack occurs, rather than be reactive after a malicious attack occurred.

In various embodiments, one or more portions of the methods and mechanisms described herein may form part of a cloud computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

In various embodiments, program instructions of a software application are used to implement the methods and/or mechanisms previously described and are stored on a non-transitory computer readable storage medium. Numerous types of storage media are available. The storage medium is accessible by a computing system during use to provide the program instructions and accompanying data to the computing system for program execution. The computing system includes at least one or more memories and one or more processors configured to execute program instructions.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computing device comprising:
an interface to a network;
a rules engine, executable by a processor, to maintain a list of a plurality of routes in a computing network;
a monitoring module, executable by a processor, to receive an indication of a first network event for a first route between a first computing device and a second computing device;
wherein in response to receiving said indication, the rules engine is configured to:
search the list for routes including the second computing device; and
in response to identifying a second route in the list, different from the first route, that includes an indication of the second computing device:
traverse routes of the plurality of routes in the list beginning with the second computing device until a finishing point is reached, wherein the finishing point is a bad hygiene endpoint or a high value target; and
generate a third route including the first computing device and the finishing point, prior to detecting any network events between the first computing device and the finishing point; and
insert the third route in the list.

2. The computing device as recited in claim 1, wherein the rules engine is further configured to sort the list based on a plurality of threat levels of the plurality of routes.

3. The computing device as recited in claim 2, wherein generating a threat level for the third route comprises providing an adjustable weight based on a level of invasiveness of a network connection used in the third route.

4. The computing device as recited in claim 3, wherein weights for remote desktop protocol (RDP) connections and secure shell (SSH) network protocol connections provide higher threat levels than weights for other types of network connections.

5. The computing device as recited in claim 2, wherein generating a threat level for the third route comprises providing an adjustable weight based on whether same data is accessed by each of the second computing device and the finishing point.

6. The computing device as recited in claim 5, wherein weights for same data accessed by modifying requests provide higher threat levels than weights for same data accessed by only read requests.

7. The computing device as recited in claim 2, wherein generating a threat level for the third route comprises providing an adjustable weight based on a number of detected malicious attacks on an endpoint within the third route.

8. The computing device as recited in claim 2, wherein generating a threat level for the third route comprises providing an adjustable weight based on a level of sensitivity of data with access controlled by a high value target within the third route.

9. A method comprising:
maintaining, by a rules engine, a list of a plurality of routes corresponding to a plurality of network events;
receiving, by a monitoring module, an indication of a first network event for a first route between a first computing device and a second computing device;
in response to receiving said indication, the rules engine:
searching the list for routes including the second computing device;
in response to identifying a second route in the list different from the first route, that includes an indication of the second computing device:
traversing routes of the plurality of routes in the list beginning with the second computing device until a finishing point is reached, wherein the finishing point is a bad hygiene endpoint or a high value target; and generating a third route including the first computing device and the finishing point, prior to detecting any network events between the first computing device and the finishing point; and inserting the third route in the list.

10. The method as recited in claim 9, further comprising sorting the list based on a plurality of threat levels of the plurality of routes.

11. The method as recited in claim 10, wherein generating a threat level for the third route comprises providing an adjustable weight based on a level of invasiveness of a network connection used in the third route.

12. The method as recited in claim 11, wherein weights for remote desktop protocol (RDP) connections and secure shell (SSH) network protocol connections provide higher threat levels than weights for other types of network connections.

13. The method as recited in claim 10, wherein generating a threat level for the third route comprises providing an adjustable weight based on whether same data is accessed by each of the second computing device and the finishing point.

14. The method as recited in claim 13, wherein weights for same data accessed by modifying requests provide higher threat levels than weights for same data accessed by only read requests.

15. The method as recited in claim 10, wherein generating a threat level for the third route comprises providing an adjustable weight based on a number of detected malicious attacks on an endpoint within the third route.

16. The method as recited in claim 10, wherein generating a threat level for the third route comprises providing an adjustable weight based on a level of sensitivity of data with access controlled by a high value target within the third route.

17. A non-transitory computer readable storage medium storing program instructions, wherein the program instructions are executable by a processor to:

maintain a list of a plurality of routes corresponding to a plurality of network events;

receive an indication of a first network event for a first route between a first computing device and a second computing device;

in response to receiving said indication:

search the list for routes including the second computing device; and in response to identifying a second route in the list, different from the first route, that includes an indication of the second computing device:

traverse routes of the plurality of routes in the list beginning with the second computing device until a finishing point is reached, wherein the finishing point is a bad hygiene endpoint or a high value target;

generating a third route including the first computing device and the finishing point, prior to detecting any network events between the first computing device and the finishing point;

insert the third route in the list.

18. The non-transitory computer readable storage device as recited in claim 17, wherein the program instructions are further executable by a processor to sort the list based on a plurality of threat levels of the plurality of routes.

19. The non-transitory computer readable storage device as recited in claim 18, wherein generating a threat level for the third route comprises providing an adjustable weight based on a level of invasiveness of a network connection used in the third route.

20. The non-transitory computer readable storage device as recited in claim 18, wherein generating a threat level for the third route comprises providing an adjustable weight based on whether same data is accessed by each of the second computing device and the finishing point.

* * * * *